United States Patent [19]
Ostaszewski

[11] Patent Number: 5,277,076
[45] Date of Patent: Jan. 11, 1994

[54] REACTIONLESS SCAN MECHANISM

[75] Inventor: Miroslaw Ostaszewski, Boulder, Colo.

[73] Assignee: Ball Corporation, Muncie, Ind.

[21] Appl. No.: 894,889

[22] Filed: Jun. 8, 1992

[51] Int. Cl.⁵ .............................................. F16H 21/44
[52] U.S. Cl. ................................................ 74/96; 74/98
[58] Field of Search ............................ 74/10.7, 96, 98

[56] References Cited

U.S. PATENT DOCUMENTS

| | | | |
|---|---|---|---|
| 2,990,720 | 7/1961 | Scholtes | 74/96 X |
| 3,532,408 | 10/1970 | Dostal | 350/6 |
| 3,612,643 | 10/1971 | Weber | 350/6 |
| 4,306,463 | 12/1981 | King | 74/96 X |
| 4,507,979 | 4/1985 | Zebrowski | 74/96 X |
| 4,540,141 | 9/1985 | Durno et al. | 74/96 X |
| 4,723,456 | 2/1988 | Köhler et al. | 74/98 X |
| 4,732,440 | 3/1988 | Gadhok | 350/6.6 |
| 4,738,500 | 4/1988 | Grupp et al. | 350/6.6 |
| 4,782,475 | 11/1988 | Chandler | 369/45 |
| 4,977,791 | 12/1990 | Erichsen | 74/96 X |
| 5,015,831 | 5/1991 | Eastman et al. | 235/462 |

Primary Examiner—Rodney H. Bonck
Assistant Examiner—David W. Laub
Attorney, Agent, or Firm—Gilbert E. Alberding

[57] ABSTRACT

Pivotal platform apparatus (10) includes a frame member (12), a platform member (14) being pivotally attached to the frame member and having a first rotational inertia, and a reaction member (20) being pivotally attached to the frame member and having a second rotational inertia. A pair of crossed taut elements (40a and 40b) provide means for transmitting reverse rotation pivotal movement between the platform member and the reaction member so that the inertia of the reaction member balances the reaction of the platform member to provide a reactionless scan mechanism. A pair of motors (26a and 26b), each having pole pieces (30a and 30b) attached to the reaction member, and each having motor coils (28a and 28b) attached to the frame member, provide means for rotationally positioning the reaction member.

23 Claims, 2 Drawing Sheets

REACTIONLESS SCAN MECHANISM

BACKGROUND OF THE INVENTION

1. Field of the Invention

The present invention relates generally to scan mechanisms for rotationally positioning a mirror or a light source. More particularly, the present invention relates to a scan mechanism in which a reaction mass balances the rotational mass of the rotationally positionable platform to provide a reactionless scan mechanism.

2. Description of the Related Art

Scan mechanisms are used for various purposes, such as reading bar codes. In such devices, a pivotally mounted platform is rotationally positioned by an electric motor. As the platform is rotationally positioned, a mirror or a light source attached to the platform is scanned across a field with encoded information, thereby cooperating with either the light source or the mirror to read the encoded information.

The prior art includes Weber, U.S. Pat. No. 3,612,643, issued Oct. 12, 1971. Weber provided a scan mechanism in which a mirror, rotatably positioned on bearings, is driven by a rotary motor and a belt.

Dostal, U.S. Pat. No. 3,532,408, issued Oct. 6, 1970, teaches a scan device in which the mirror is mounted on a torsionally deflectable member, pole pieces are attached to opposite sides of the mirror, and field coils are attached to a frame of the device.

Chandler, in U.S. Pat. No. 4,782,475, issued Nov. 1, 1988, teaches a scan mechanism in which the optical element of a read head is supported by a four-member flexure structure, one portion of the motor is attached to the read head, and another portion of the motor is attached to the frame of the mechanism. The four-member flexure structure includes first and second supporting elements that are attached at opposite ends thereof and that cross proximal to the middle of each of the flexure elements.

SUMMARY OF THE INVENTION

In the present invention, a pivotal platform apparatus is provided which includes: a frame member; a platform member that is pivotally attached to the frame member and that has a first rotational inertia; a reaction member that is pivotally attached to the frame member and that has a second rotational inertia; means, which may include a pair of metal flexure elements or a pair of meshing gears, for transmitting pivotal movement between the reaction member and the platform member; a motor that is attached to the reaction member and that provides relative rotational positioning of the reaction member; and means for using the second rotational inertia of the reaction member to react against the first rotational inertia of the platform member.

The means for using the second rotational inertia of the reaction member to react against the first rotational inertia of the platform member includes means for transmitting opposite rotation positioning between the reaction member and the platform member.

In a first aspect of the present invention, pivotal platform apparatus is provided which comprises a frame member, a platform member being pivotally attached to the frame member and having a first rotational inertia, a reaction member being pivotally attached to the frame member and having a second rotational inertia, means for transmitting pivotal movement between the platform member and the reaction member, means for pivotally positioning one of the pivotally attached members, and means for using the second rotational inertia of the reaction member to react against the first rotational inertia of the platform member.

In a second aspect of the present invention, pivotal platform apparatus is provided which comprises a frame member, a platform member being pivotally attached to the frame member and having a first rotational inertia, a reaction member being pivotally attached to the frame member and having a second rotational inertia, means, including a motor that is drivingly connected to the frame member and to one of the members, for rotationally positioning the platform member, and means for using the second rotational inertia to react against the first rotational inertia.

In a third aspect of the present invention, a method is provided for pivotally positioning a platform member, which method comprises pivotally mounting the platform member to a frame member, pivotally mounting a reaction member to the frame member, pivotally positioning one of the pivotally mounted members, transmitting pivotal movement from the one pivotally mounted member to the other of the pivotally mounted members, and using pivotal movement of the reaction member to balance inertial reaction of the platform member.

DESCRIPTION OF THE PREFERRED EMBODIMENTS

Figure 1:
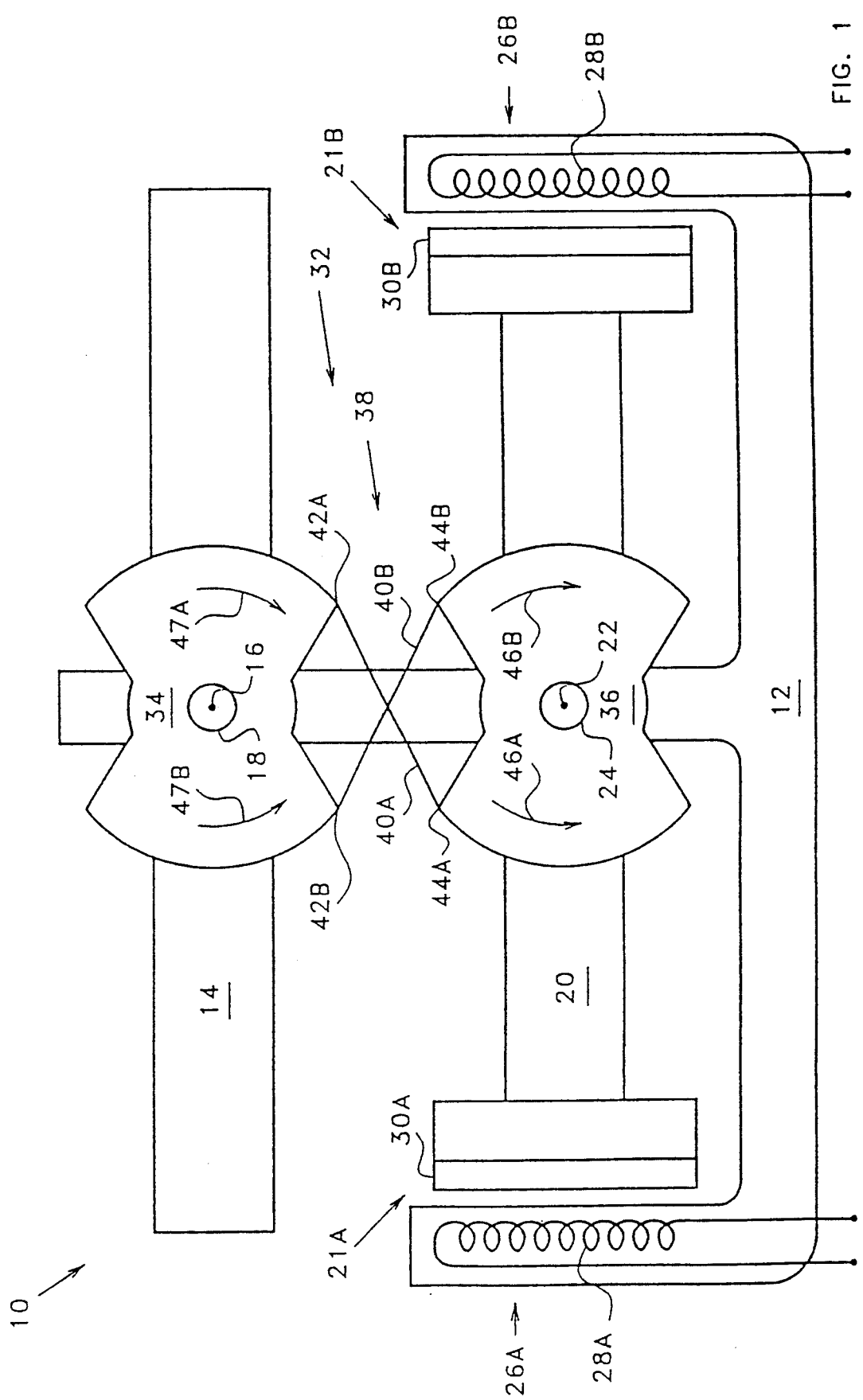
FIG. 1 is a first simplified embodiment of the present invention in which opposite rotational positioning of the reaction member and the platform member is achieved by a pair of flexure elements.

Referring now to FIG. 1, in a first embodiment of the present invention a reactionless pivotal platform apparatus 10 includes a frame member 12, a first platform member 14 that is pivotally attached or mounted around a first pivot axis 16 by a shaft 18, a reaction member, or elongated member, 20 that includes first and second ends, 21a and 21b, and that is pivotally attached or mounted around a second pivot axis 22 by a shaft 24, the second axis 22 being parallel and spaced apart from the first axis 16, and first and second motors, 26a and 26b. The first and second motors, 26a and 26b, include, respectively, first and second parts, or first and second motor coils, 28a and 28b, and first and second magnetic pole pieces, or relatively positionable parts, 30a and 30b. The shafts, 18 and 24, are attached to the frame member 12 by any suitable means, not an inventive part of the present invention.

A flexure drive 32 interconnects the platform member 14 and the reaction member 20 imparting reverse rotation positioning, or reverse rotation pivotal movement, between the pivotally attached members, 14 and 20. The flexure drive 32 includes first and second drive segments, 34 and 36, that are attached to respective ones of the pivotally attached members, 14 and 20, and a metal flexure 38.

The metal flexure 38 includes first and second metal flexure elements, or first and second taut elements, 40a and 40b, having first ends, 42a and 42b, and second ends, 44a and 44b. The metal flexure elements, 40a and 40b, cross intermediate of the ends, 42a, 42b, 44a, and 44b, thereof to provide reverse rotation positioning between the platform member 14 and the reaction member 20.

In operation, a mirror, not shown, not an inventive part of the present invention, or a light source, not shown, not an inventive part of the present invention, is attached to the platform member 14. As the motor coils, 28a and 28b, are energized, the pole pieces, 30a and 30b, react with the motor coils, 28a and 28b, to rotationally position the reaction member 20 about the pivot axis 22. This rotational positioning of the reaction member 20 about the second pivot axis 22 is used to rotationally position the platform member 14 in a rotationally opposite direction.

With a first pivotal rotation 46a, the drive segment 36 rotates counterclockwise, pulling the flexure element 40a downwardly, thereby imparting a second pivotal rotation 47a to the drive segment 34 causing it to rotate clockwise. In like manner, with a first pivotal rotation 46b, the drive segment 36 rotates clockwise, pulling the flexure element 40b downwardly, thereby imparting a second pivotal rotation 47b to the drive segment 34 causing it to rotate counterclockwise.

By selectively sizing the reaction member 20 in accordance with the inertia of the platform member 14, taking into account the relative rotational speeds of the platform member 14 and the reaction member 20, the rotational mass of the reaction member 20 balances the inertial forces of the platform member 14, thereby providing reactionless operation of the pivotal platform apparatus 10.

Further, as illustrated, the drive segments, 34 and 36, are the same size so that the rotational speeds of the platform member 14 and the reaction member 20 are equal. Thus, with rotational speeds being equal, when the rotational inertias of the platform member 14 and the reaction member 20 are equal, the apparatus 10 is reactionless.

Figure 2:
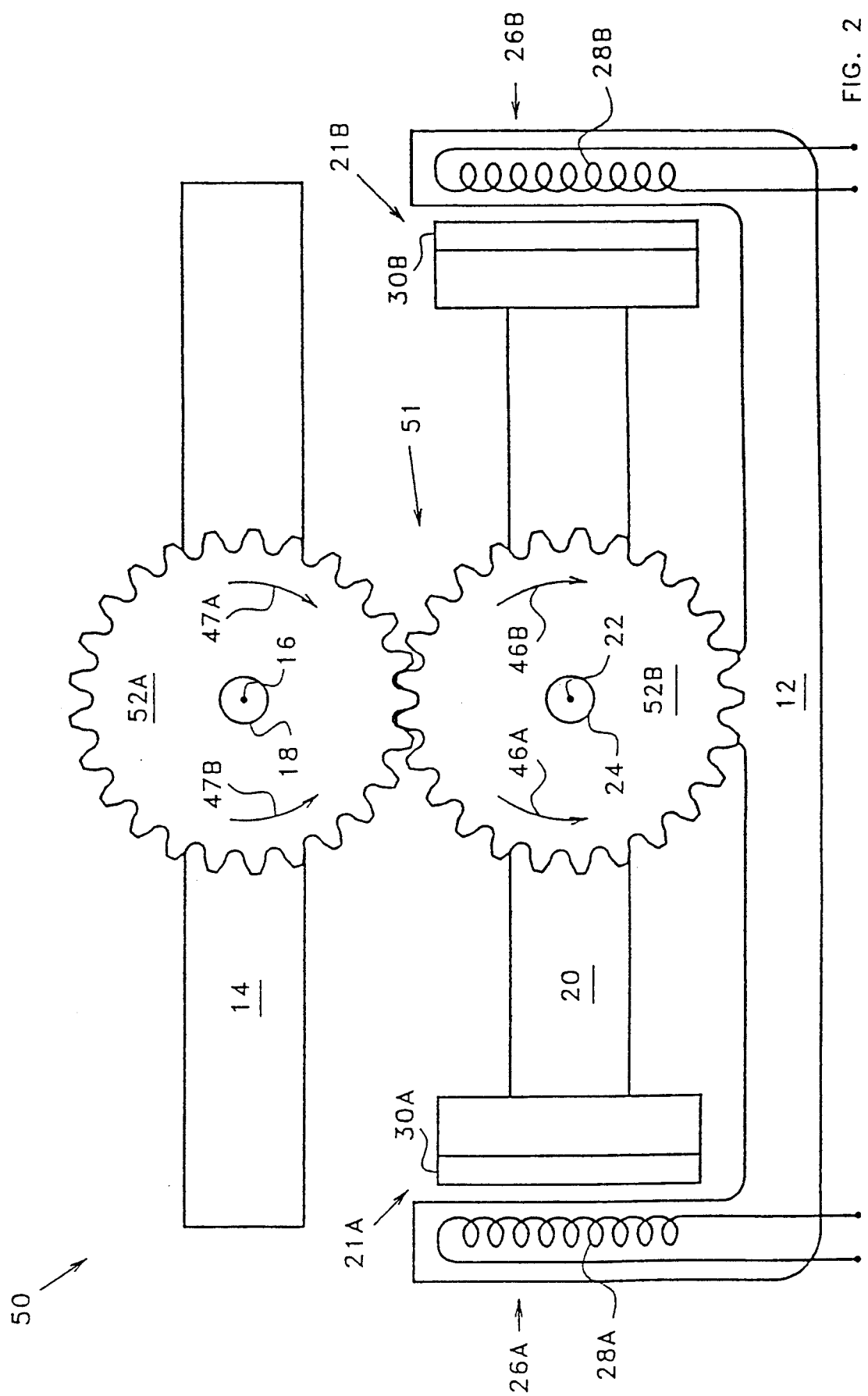
FIG. 2 is a second simplified embodiment of the present invention, differing from the embodiment of FIG. 1 in that a pair of meshing gears provide opposite rotational positioning of the reaction member and the platform member.

Referring now to FIG. 2, in a second embodiment of the present invention a reactionless pivotal platform apparatus 50 generally includes like-numbered and like-named parts as the reactionless pivotal platform apparatus 10.

However, whereas the platform member 14 and the reaction member 20 are interconnected by metal flexure elements 40a and 40b in the FIG. 1 embodiment, the platform member 14 and the reaction member 20 are interconnected by a mesh gear drive 51 that includes gears 52a and 52b in the FIG. 2 embodiment.

It should be understood that both the pivotal platform apparatus 10 and the pivotal platform apparatus 50, as shown and described, are simplified illustrations. Those skilled in the art will be able to combine the simplified constructions shown herein with prior art designs, such as those referenced above, to provide state of the art designs.

For purposes of understanding the appended claims, in the embodiment of FIG. 1 the flexure drive 32, which includes the drive segments, 34 and 36, and the flexure elements, 40a and 40b, provides means for transmitting pivotal movement between the platform member 14 and the reaction member 20. Further, this means for transmitting pivotal movement between the platform member 14 and the reaction member 20 provides means for transmitting rotationally opposite pivotal movement.

Also for purposes of understanding the appended claims, in the embodiment of FIG. 2 the gears 52a and 52b provide means for transmitting pivotal movement between the platform member 14 and the reaction member 20. Further, this means for transmitting pivotal movement between the platform member 14 and the reaction member 20 provides means for transmitting rotationally opposite pivotal movement.

The first and second motors, 26a and 26b, together with the motor coils, 28a and 28b, and the pole pieces, 30a and 30b, thereof provide means for pivotally positioning one of the pivotally attached members, and more particularly for pivotally positioning the reaction member 20.

The pivotal platform apparatus 10 includes means for using the second rotational inertia of the reaction member 20 to react against the first rotational inertia of the first platform member 14 to provide a reactionless pivotal platform apparatus 10. This means for using the second rotational inertia of the reaction member 20 to react against the first rotational inertia of the platform member 14 includes means for transmitting reverse direction rotational movement between the pivotally attached members, 14 and 20.

Further, since the pole pieces, 30a and 30b, are attached to the reaction member 20, the mass of the pole pieces, 30a and 30b, provide additional mass for balancing inertial forces of the platform member 14.

A method of the present invention includes pivotally mounting the platform member 14 to the frame member 12, pivotally mounting the reaction member 20 to the frame member 12, pivotally positioning one of the pivotally mounted members 20, transmitting pivotal movement from the one pivotally mounted member 20 to the other of the pivotally mounted members 14, and using pivotal movement of the reaction member 20 to balance the inertial reaction of the platform member 14.

While specific methods and apparatus have been disclosed in the preceding description, it should be understood that these specifics have been given for the purpose of disclosing the principles of the present invention and that many variations thereof will become apparent to those who are versed in the art. Therefore, the scope of the present invention is to be determined by the appended claims.

Industrial Applicability

The present invention is applicable to scan devices in which a mirror or a light source is pivotally positioned in response to a drive motor. This apparatus can also be used to position telescopes, detectors, and other equipment where it is desirable to minimize reactions transmitted to the support structure.

What is claimed is:

1. Pivotal platform apparatus which comprises:
   a frame member;
   a platform member being pivotally attached to said frame member and having a a first rotational inertia;
   a reaction member being pivotally attached to said frame member and having a second rotational inertia;
   means for transmitting pivotal movement between said platform member and said reaction member;
   Means for pivotally positioning one of said pivotally attached members; and
   means for using said second rotational inertia of said reaction member to react against said first rotational inertia of said platform member to create a reactionless system.

2. Pivotal platform apparatus as claimed in claim 1 in which said means for transmitting pivotal movement between said platform member and said reaction member comprises means for transmitting pivotal movement that is rotationally opposite; and
   said means for using said second rotational inertia of said reaction member to react against said first rotational inertia comprises said rotationally opposite pivotal movement.

3. Pivotal platform apparatus as claimed in claim 1 in which said means for transmitting pivotal movement between said platform member and said reaction member comprises a flexure element.

4. Pivotal platform apparatus as claimed in claim 1 in which said means for transmitting pivotal movement between said platform member and said reaction member comprises:
   a first flexure element having first and second ends that are connected to respective ones of said pivotally attached members;
   a second flexure element having first and second ends that are connected to respective ones of said pivotally attached members; and
   said flexure elements crossing intermediate of said ends.

5. Pivotal platform apparatus as claimed in claim 1 in which said means for pivotally positioning said one member comprises a motor having a first part that is attached to said frame member, and having a relatively positionable part that is attached to one of said pivotally attached members.

6. Pivotal platform apparatus as claimed in claim 1 in which said means for pivotally positioning said one member comprises a motor having a pole piece and a motor coil that are attached to different ones of said members.

7. Pivotal platform apparatus as claimed in claim 1 in which said reaction member is an elongated member having first and second ends;
   said means for pivotally positioning said one member comprises first and second motors having first and second pole pieces that are attached to said reaction member proximal to respective ones of said ends thereof, and first and second motor coils that are attached to said frame member in working proximity to respective ones of said pole pieces; and
   said second inertia of said reaction member comprises said first and second pole pieces.

8. Pivotal platform apparatus as claimed in claim 1 in which said pivotal attachment of said platform member comprises said platform member being pivotally attached around a first axis;
   said pivotal attachment of said reaction member comprises said reaction member being pivotally attached around a second axis that is parallel to, and spaced apart from, said first axis; and
   said means for transmitting pivotal movement between said pivotally attached members comprises means for transmitting reverse rotation positioning between said pivotally attached members.

9. Pivotal platform apparatus as claimed in claim 1 in which said pivotal attachment of said platform member comprises said platform member being pivotally attached around a first axis;
   said pivotal attachment of said reaction member comprises said reaction member being pivotally attached around a second axis that is parallel to, and spaced apart from, said first axis; and
   said means for transmitting pivotal movement between said pivotally attached members includes means, comprising a flexure drive, for transmitting reverse rotation positioning between said pivotally attached members.

10. Pivotal platform apparatus as claimed in claim 1 in which said pivotal attachment of said platform member comprises said platform member being pivotally attached around a first axis;
    said pivotal attachment of said reaction member comprises said reaction member being pivotally attached around a second axis that is parallel to, and spaced apart from, said first axis; and
    said means for transmitting pivotal movement between said pivotally attached members includes means, comprising first and second taut elements that are crossed, for transmitting reverse rotation positioning between said pivotally attached members.

11. Pivotal platform apparatus as claimed in claim 1 in which said attaching of said platform member comprises said platform member being attached around a first pivot axis;
    said attaching of said reaction member comprises said reaction member being pivotally attached around a second pivot axis that is spaced apart and parallel to said first pivot axis;
    said means for transmitting pivotal movement between said platform member and said reaction member includes means, comprising a metal flexure element, for transmitting opposite rotation pivotal movement therebetween;
    said means for pivotally positioning said one pivotally attached member comprises a pair of magnetic pole pieces being attached to said reaction member in spaced apart locations, and a pair of motor coils being attached to said frame member in locations wherein said motor coils cooperate with respective ones of said magnetic pole pieces; and
    said means for using said second rotational inertia to react against said first rotational inertia comprises said opposite rotation pivotal movement.

12. Pivotal platform apparatus as claimed in claim 1 in which said means for transmitting pivotal movement between said platform member and said reaction member comprises:
    a first gear that is operatively connected to one of said pivotally attached members; and
    a second gear that is operatively connected to the other of said pivotally attached members, and that meshes with said first gear.

13. Pivotal platform apparatus which comprises:
    a frame member;
    a platform member being pivotally attached to said frame member and having a first rotational inertia;
    a reaction member bring pivotally attached to said frame member and having a second rotational inertia;
    means, comprising a motor that is drivingly connected to said frame member and to one of said members, for rotationally positioning said platform member; and means for using said second rotational inertia to react against said first rotational inertia to create a reactionless system.

14. Pivotal platform apparatus as claimed in claim 13 in which said means for using said second rotational inertia to react against said first rotational inertia comprises means for rotationally positioning said reaction member in an opposite direction from said rotational positioning of said platform member.

15. A method for pivotally positioning a platform member, which method comprises:
    a) pivotally mounting said platform member to a frame member;
    b) pivotally mounting a reaction member to said frame member;
    c) pivotally positioning one of said pivotally mounted members;
    d) transmitting pivotal movement from said one pivotally mounted member to the other of said pivotally mounted members; and
    e) using pivotal movement of said reaction member to balance inertial reaction of said platform member to create a reactionless system.

16. A method as claimed in claim 15 in which said transmitting step comprises transmitting reverse rotation pivotal positioning.

17. A method as claimed in claim 15 in which said transmitting step comprises transmitting reverse rotation pivotal positioning; and
    said using step comprises said reverse rotation pivotal positioning.

18. A method as claimed in claim 15 in which said pivotal positioning step comprises:
    a) mounting one relatively positionable part of a motor on said one pivotally positioned member; and
    b) mounting another relatively positionable part of said motor on said frame member.

19. A method as claimed in claim 15 in which said pivotal positioning of said one member comprises:
    a) mounting first and second magnetic pole pieces in spaced apart locations on said one member; and
    b) attaching first and second coils to said frame member in cooperating locations with said pole pieces.

20. A method as claimed in claim 15 in which said transmitting step comprises drive-flexure transmitting.

21. A method as claimed in claim 15 in which said transmitting step comprises drive-flexure transmitting; and
    said transmitting step further comprises transmitting reverse rotation positioning.

22. A method as claimed in claim 15 in which said transmitting step comprises interconnecting said pivotally mounted members with first and second taut elements that cross intermediate of said pivotally mounted members.

23. A method as claimed in claim 15 in which said transmitting step comprises gear-drive transmitting; and
    said transmitting step further comprises transmitting reverse rotation positioning.

* * * * *